(12) United States Patent
Docherty et al.

(10) Patent No.: US 10,091,555 B1
(45) Date of Patent: Oct. 2, 2018

(54) LINEAR PROGRAMMING CONSUMPTION LEARNING SYSTEM

(71) Applicant: ThinkAnalytics, El Segundo, CA (US)

(72) Inventors: Peter Docherty, Glasgow (GB); Ewen Cattanach, Woodbridge (GB); Bruce Zhang, Glasgow (GB); David Scott, Glasgow (GB); Shahad Ahmed, Glasgow (GB); Alan Ryman, Glasgow (GB); Asim Ullah, Glasgow (GB); Darren Callaghan, Glasgow (GB); Gordon McIntyre, Glasgow (GB)

(73) Assignee: ThinkAnalytics, El Segundo, CA (US)

( * ) Notice: Subject to any disclaimer, the term of this patent is extended or adjusted under 35 U.S.C. 154(b) by 0 days.

(21) Appl. No.: 14/754,619

(22) Filed: Jun. 29, 2015

Related U.S. Application Data

(60) Provisional application No. 62/018,476, filed on Jun. 27, 2014.

(51) Int. Cl.
*H04N 7/16* (2011.01)
*H04N 21/466* (2011.01)
*H04N 21/45* (2011.01)

(52) U.S. Cl.
CPC ..... *H04N 21/4668* (2013.01); *H04N 21/4532* (2013.01); *H04N 21/4667* (2013.01)

(58) Field of Classification Search
CPC .......... H04N 21/64322; H04N 21/252; H04N 21/462; H04N 21/8456; H04N 21/25866; H04N 21/2668; H04N 21/25435; H04N 21/2402; H04N 21/2665; H04N 21/466; H04N 21/2547; H04N 21/812; H04N 21/440263; H04N 21/431; H04N 21/482; H04N 21/4821; H04N 21/4307; H04N 21/42203; H04N 21/4316
USPC .......... 725/46, 10, 87, 37, 14, 32, 9, 23, 62, 725/116, 110, 49, 41, 131, 38, 80, 18, 25, 725/118, 91; 705/1.1, 40
See application file for complete search history.

(56) References Cited

U.S. PATENT DOCUMENTS

| | | | | |
|---|---|---|---|---|
| 8,588,749 | B1 * | 11/2013 | Sadhvani | H04M 1/24 379/1.01 |
| 2003/0115585 | A1 * | 6/2003 | Barsness | H04H 60/64 725/9 |
| 2005/0235318 | A1 * | 10/2005 | Grauch | G06Q 30/02 725/46 |
| 2008/0208740 | A1 * | 8/2008 | Uehara | G06Q 20/102 705/40 |
| 2009/0138326 | A1 * | 5/2009 | Shi | H04N 7/163 705/1.1 |

* cited by examiner

*Primary Examiner* — Nasser Goodarzi
*Assistant Examiner* — An Nguyen
(74) *Attorney, Agent, or Firm* — FSP LLC

(57) ABSTRACT

A machine system for operating a content recommendation system includes a monitor to detect and identify user actions on network connected digital devices, a first associator to relate the user actions to digital content, a timer operable to control a minimum time period filter on the user actions, a sequencer operable in conjunction with the timer, the minimum time period filter, and a combiner to transform the user actions into aggregate user actions. The content recommendation system is responsive to the aggregate user actions to evolve a computer-stored user profile according to the aggregate user actions.

22 Claims, 7 Drawing Sheets

Table 1

| Channel | Content Item | Time | Duration | Send LA |
|---|---|---|---|---|
| Channel A | Coronation Street | 19:30 | 12 minutes | Y |
| Channel X | Mastermind | 19:42 | 3 minutes | N |
| Channel A | Coronation Street | 19:45 | 12 minutes | N |

Table 2

| Channel | Content Item | Time | Duration | Send LA |
|---|---|---|---|---|
| Channel A | Coronation Street | 19:30 | 8 minutes | N |
| Channel X | Mastermind | 19:42 | 3 minutes | N |
| Channel A | Coronation Street | 19:45 | 9 minutes | Y |

Table 3

| Channel | Content Item | Time | Duration | Send LA |
|---|---|---|---|---|
| Channel A | Program 1 | 19:55 | 5 minutes | N |
| Channel A | Program 2 | 20:00 | 60 minutes | Y |
| Channel A | Program 3 | 21:00 | 60 minutes | N |
| Channel A | Program 4 | 22:00 | 30 minutes | N |
| ... | ... | ... | ... | ... |
| | | *Next Day* | | |
| Channel A | Program 24 | 19:00 | 60 minutes | N |
| Channel B | Program 25 | 19:57 | 25 minutes | Y |

LINEAR PROGRAMMING CONSUMPTION LEARNING SYSTEM

CROSS-REFERENCE TO RELATED APPLICATIONS

This application claims priority under 35 U.S.C. 119 to U.S. application Ser. No. 62/018,476, titled LINEAR PROGRAMMING CONSUMPTION LEARNING SYSTEM, filed on Jun. 27, 2014, which is incorporated herein by reference in its entirety.

BACKGROUND

Linear programming is a popular form of content delivery. There are systems that analyze what a viewer watches from linear sources and suggest related titles. However, these systems don't take into account many factors that can weight or affect the relevance of a particular viewing choice.

BRIEF SUMMARY

Embodiments of machine system for operating a content recommendation system are described that include a monitor to detect and identify user actions on network connected digital devices, a first associator to relate the user actions to digital content, a timer operable to control a minimum time period filter on the user actions, a sequencer operable in conjunction with the timer, the minimum time period filter, and a combiner to transform the user actions into aggregate user actions. The content recommendation system is responsive to the aggregate user actions to evolve a computer-stored user profile according to the aggregate user actions.

In some embodiments, such a machine system may further include a second associator operable in conjunction with the timer and an adjuster to associate weight values with the aggregate user actions and the user actions, forming weighted user actions and/or the content recommendation system responsive to the weighted user actions to evolve the user profile.

In some embodiments, such a machine system may further include the monitor to further detect and identify operations of the digital devices and/or the first associator to relate the operations of the digital devices to the user actions.

In some embodiments, such a machine system may further include a content recommender to recommend the digital content to the digital devices responsive to the user profile.

In some embodiments, such a machine system may further include the aggregate user actions formed based on configured intervals between the user actions as measured by the timer.

In some embodiments, such a machine system may further include at least one of the aggregate user actions formed from an accumulation of playback of a particular digital content item over a group of separated time intervals.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 5 illustrates various content viewer behavior scenarios.

DETAILED DESCRIPTION

Glossary

Figure 1:
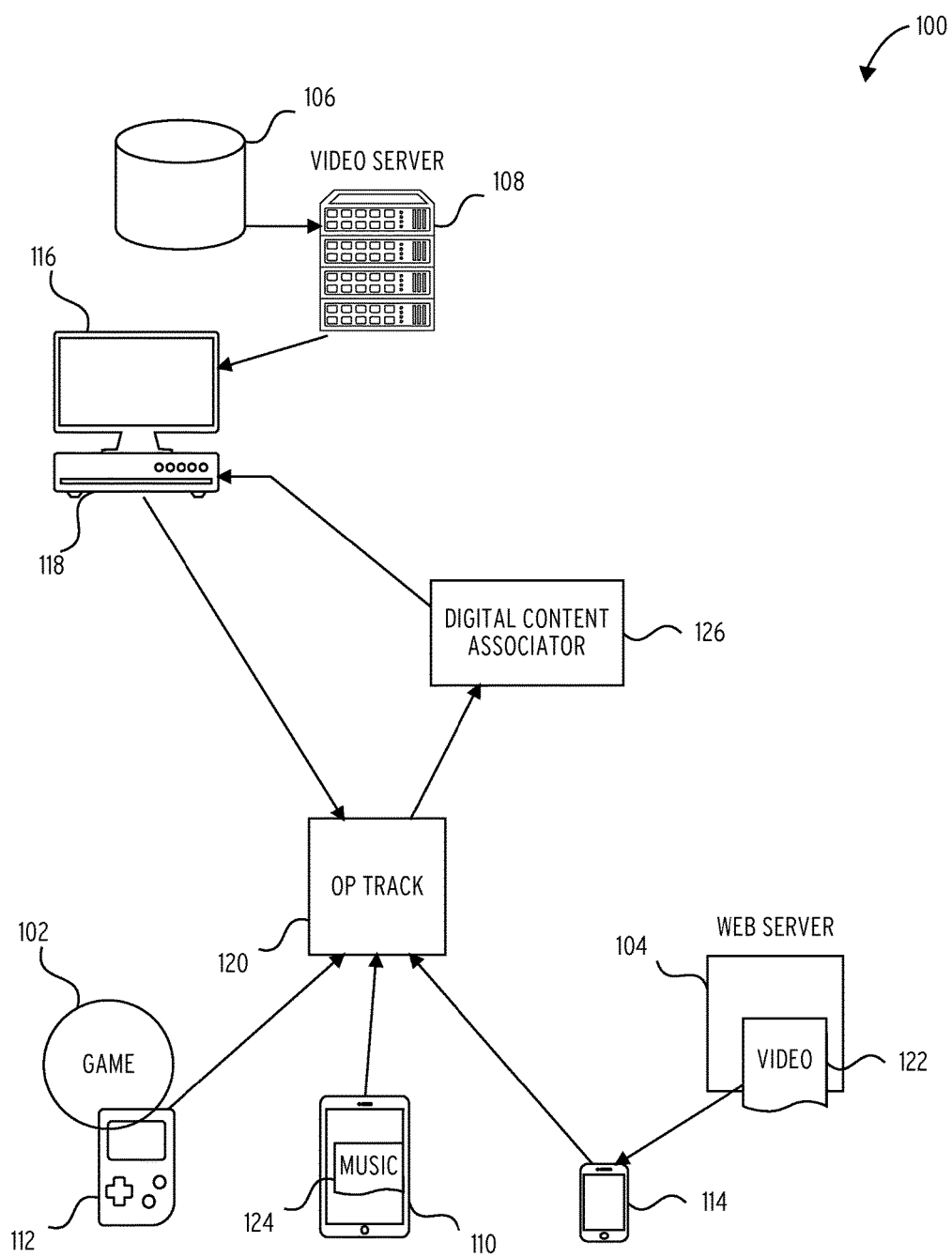
FIG. 1 illustrates an embodiment of an activity classification and content association system 100.

"Set Top Box" in this context refers to (STB) an electronic device that adapts a communications medium to a format that is accessible by the end user. Set top boxes are commonly located in a customers home to allow the reception of video signals on a television or computer.

"Video" in this context refers to pixels captured and stored by a device representing a sequence of moving pictures. Video may be captured, stored, and communicated by devices in either analog or digital formats. (1) Refers to recording, manipulating, and displaying moving images, especially in a format that can be presented on a television. (2) Refers to displaying images and text on a computer monitor or mobile device. The video adapter, for example, is responsible for sending signals to the display device. (n.) A recording produced with a video recorder (camcorder) or some other device that captures full motion.

"Video Server" in this context refers to a server that provides video and/or specialized television capabilities. Video servers receive requests for video and/or media delivery, find the matching media, and deliver the video program as requested.

"Web server" in this context refers to a device or device system that delivers web pages in response to requests for the web pages from web browsers. Also, logic to communicate web pages at the request of clients, most typically using the Hypertext Transfer Protocol (HTTP). The server communicates HTML documents and any additional content that may be included by a document, such as images, style sheets and scripts, as well as content referenced by certain types of links (pointers) in the web pages. A user agent, commonly a web browser or web crawler, initiates communication with the web server by making a request for a resource using (typically) HTTP, and the server responds with the content of that resource or an error message if unable to do so. The resource is typically a file on the server's secondary storage, but this is not necessarily the case. Many web servers have a capability of receiving content from clients. This feature is used for submitting web forms, including uploading of files.

DESCRIPTION

Embodiments of a system are described that operate a timer to control a minimum time period filter to control learn actions for a content recommender 218 (CRE).

Consider a situation in which a person operates a communication channel changing device. The user may "zap" through channels to find content that they are interested in viewing. The time period associated with channel change events may be very short, possibly only a few seconds or even less than a second. Such events may be detected and filtered from reaching the CRE. For example, see Table 1 in FIG. 5.

The minimum time period filter may be operated to restrict learn actions to the CRE to viewing events of higher relevance. In one embodiment the minimum time period filter is configured with minimum time period of 10 minutes.

In one embodiment the following physical behavior is transformed by the system into a sequence of events: (1) a person views a content item until an advert break occurs, (2) the person changes channels, and (3) the person resumes viewing the content item before the end of the adverts.

In one embodiment, this physical behavior pattern is detected by sensors of an event detector. The event detector may detect an event for the period of the program (content) up to the advert break; an event for the period spent by the viewer on another channel during the advert break; and an event for the period of the program after the advert break.

The minimum time period filter may be operated to discard the second event, so that the operation of the CRE is influenced by two consecutive events comprising the viewing up to the advert break and the period of viewing after the advert break. Furthermore, an action identifier 206 may be operated cooperatively with the minimum time period filter to combine the two consecutive events output from the minimum time period filter into a single event having a duration of the combined duration of the two output events. This combined event may be applied to control the CRE. Delay logic may be applied to cause events applied to the CRE to be delayed by a configured time interval (e.g., 10 minutes). The system thus operates the CRE more efficiently, and conserves memory capacity and bandwidth capacity over conventional systems.

A timer override may be applied to events. For example, events that affect operation of the CRE ("learn events") may associated with a time other than a current time output by the timer, by associating with the events an action time parameter. For a timeslot subscriber, this may determine which timeslot the event will influence the operation of the CRE against. In one embodiment either of the following times may be associated with an event:

a) The start time of the content item being broadcast at the end of the minimum time period filter period.

b) The end time of the minimum time period filter period (i.e 10 minutes after a channel change).

The option applied may depend on which date/time is accessible at the time of applying the event as a learn action against the CRE.

In some embodiments the zap time (moment of channel change) is not made available as the action time, as this may lead to influencing the CRE operation ("learning") against the wrong timeslot (for a timeslot subscriber). This situation may occur for example if the viewed content item starts on a timeslot boundary.

Consider the previous example, but with slightly different time periods (See Table 2, FIG. 5)

The system may further include a re-sequencer interoperable with the minimum time period filter. Utilizing the re-sequencer, if two short events for the same content item are interrupted by a zap away from the content item, and each of the short events measures less than the minimum time interval configured for the minimum time period filter, the three events may be re-sequenced to make the interrupted content viewing events sequential. The short sequential events may be combined into a combined event that is longer than the configured minimum time period filter interval. The combined event passes the minimum time period filter and becomes a learn event to the CRE.

A limiter may be employed. The limiter may be operable to cause a single learn event to be generated for the viewing behavior after the most recent channel zap. For a specific deployment it may be that this limit to a single program should be reviewed based on local country-specific behavior. This may detect situations where the viewer has left their viewing device active but left the area. For example, a person may forget to switch off their set-top box when they go to bed at night, or when they go to work in the morning. For example, see Table 3 in FIG. 5.

The system may generate a learn action for the above viewing behavior upon and as a result of the configured viewing time threshold being detected. Learning may thus take place in real time to evolve the user profile as soon as possible for subsequent content recommendation requests.

To further improve the bandwidth management and response time of the system, individual events and/or learn actions (transformed events) may be applied in real-time rather than batching them at potentially peak times. This is potentially load-reducing as the details of the viewer who took the action may still be retained in the cache of the CRE whereas if the action call is delayed the viewer information may need to be re-loaded from database, thereby increasing the load on back-end systems. The CRE may nonetheless support the capability to process groups of events (e.g., involving different content items) in a single learn action and to also specify the time that the action took place.

When the system is operated in subscriber timeslot mode (e.g., to build multiple user profiles for a single set top box for a multitenant household, based on time of day/day of week), a single learn action having multiple content item ids specified may assign the features of those items to the timeslot associated with the specified action time in the learn action.

Embodiments of a system are disclosed wherein learned actions are formed to control the operation of a digital content recommendations engine (CRE) for identified users of digital devices. User actions may be associated with device operation for downloaded, recorded, purchased, watched or played content items, for example. Learned actions be applied to enhance the user's profile of content preferences and therefore provide more accurate personalized content recommendations to the user in the future.

User actions and device operational data is analyzed for events that define a user's activity and interactions with the various content items that they have watched, downloaded, purchased, etc.

If a sequence of different events is received for a same content item, then each of the event types may be used as a separate learn action with the specific activity type defined. Sequencing learn actions in this manner ensures a user's profile dynamically updates to reflect the evolving interaction with the content item. Updating the profile in dynamic increments provides the CRE an advantage of using the updated profile, allowing for better personalized results. This effect may be amplified if the events are separated by variable amounts of time, for example a user purchases an item today, but watches the item in four days time. Below are some example scenarios:

Upon associating actions/operations with a particular activity actionId (e.g. Download, Purchased, Played), the CRE may apply a relative weighting scheme for the features of the item to be assigned to the users taste profile for that particular action type of content category. Certain of the activity types may be assigned a lower weight and therefore impact on the taste profile. For example, wish-listing, bookmarking or browsing may have, by default, a lesser impact on a users learned taste profile than, say, purchasing, downloading or playing an item.

A learn action issued in response to a purchase of digital content may associate the content event and financial payment and thus be weighted higher by the CRE.

If the association is erroneous, and a payment is only made when, for example, a follow-up played consumption event is initiated, then the purchased learn action weighting could be lowered from the default setting within the CRE, thus reducing its influence on evolving the user profile. A reason for reducing the weight is that a user may initiate a purchased event far more frequently than a played event, especially if they are not charged for the initial purchased event.

If there are content items that are downloadable on either a paid for basis, for example a transactional item, or on a free to download basis, for example a catch-up or subscription content service, then learn actions may be sent with activity types that differentiate between the two sorts of content. For example a purchased activity could be assigned to the paid-for items and a download event assigned to the free items. For free items, the activity weighting for the learn action may be lowered to ensure that the impact is adjusted against the potential more frequent event type.

Custom activity types can also be defined to capture the exact intent of an event if the default activity types defined for the learn action aren't representative.

If certain content items have associated pre-roll, mid-roll, or post-roll adverts, then generating a learn action that indicates that a user has watched the Item with a pre-roll (or mid-roll) advert may help differentiate that watch activity as having a higher impact on the users taste profile, as the user has had to invest some time in watching an additional advert to watch the item. Creating a custom activity type for the learn action could be used to capture this behavior. This new activity type may then be assigned a higher weighting than the default played or watched activity types.

Short content items that fall into a number of different content categories:
  Trailers—item that represents a trailer for a current or upcoming content item;
  Interviews—items containing cast/crew interviews for a current/upcoming content item;
  Extras—items containing 'Behind the Scenes', Recap or other content These short items could be associated with a 'full' content item, such as a movie, series or a particular episode, and a learn action may be generated for watching such a short item, with an appropriately reduced activity weighting. A default activity type called 'watch' or 'listen to trailer' may be configured, but a custom activity type could be configured to represent more accurately the use-cases around watching short items.

If the consumption event for the content item is of type 'played' and the duration of the event and the full running length of the content item is known, then the total played duration for the item can be calculated. A learn action may then be generated for the item if the duration played was greater than a percentage of the items running length. An example for this percentage is 30%. This means that a learn action is generated only after 30% of an item's running length has been played. An example of this is: The movie 'Avatar' has running time of 171 minutes, and a user starts playing the VOD asset, but watches it in sections over a period of time. When it is recognised that the user has watched over 30% of the VOD item (in the example above it is a combined play duration greater than 52 minutes) a learn action for the played activity is fired to signify that the users taste profile should be updated with the knowledge that they watched Avatar and the features of this item will then be added to their profile to further personalize subsequent recommendation requests.

If there are several played events associated with the same content item, then the combined duration of these events may be used to determine the total percentage played. If the configured threshold percentage is met and a learn action is fired, then there may be no need to generate a further learn action for any subsequent play events for that item during consumption analysis.

In some embodiments learn actions are generated as soon as the configured time threshold/behavior has been detected. This ensure the learning takes place in real time and impacts the user profile as soon as possible for subsequent recommendation requests.

Learn actions may be processed one by one—rather than batching them at potentially peak times. Processing the learn actions immediately is potentially load-reducing as the details of the customer who took the action will likely still be in the cache of the CRE whereas if the action call is delayed the customer may need to be re-loaded from database, thereby increasing the load on back-end systems. The CRE may nonetheless support the capability to take groups of content item ids in a single learn action and to also specify the time that the action took place.

When the system is operated in timeslot mode (to build multiple profiles for a single end user device based on time of day/day of week, for example), a single learn action call with multiple item ids specified may assign the features of those items to the timeslot associated with the specified action time in the learn action. This may occur for example if a user purchases multiple content items at the same time.

DRAWINGS

FIG. 1 illustrates an embodiment of an activity classification and content association system 100. The system comprises a content associator 106, a video server 108, a digital content associator 126, and a machine operation tracking system 120.

Devices that may influence the operation of the activity classification and content association system 100 include a set top box 118 coupled with a television 116, a game machine 112 executing game logic 102, a mobile phone 114 that renders a downloaded video 122 from a web server 104, and a tablet 110 that renders a digital music file 124.

The machine operation tracking system 120 detects and identifies content rendered by the various devices and also detects and measures user actions involving said content, for example swipes, clicks, pauses, resumes, fast forwards, rewinds, and ad exposures.

Device operation tracking measurements, content identifications, and associated user actions from the machine operation tracking system 120 are provided to the digital content associator 126 for processing into user interface controls directed back to one or more of the devices, in this example the set top box 118.

Figure 2:
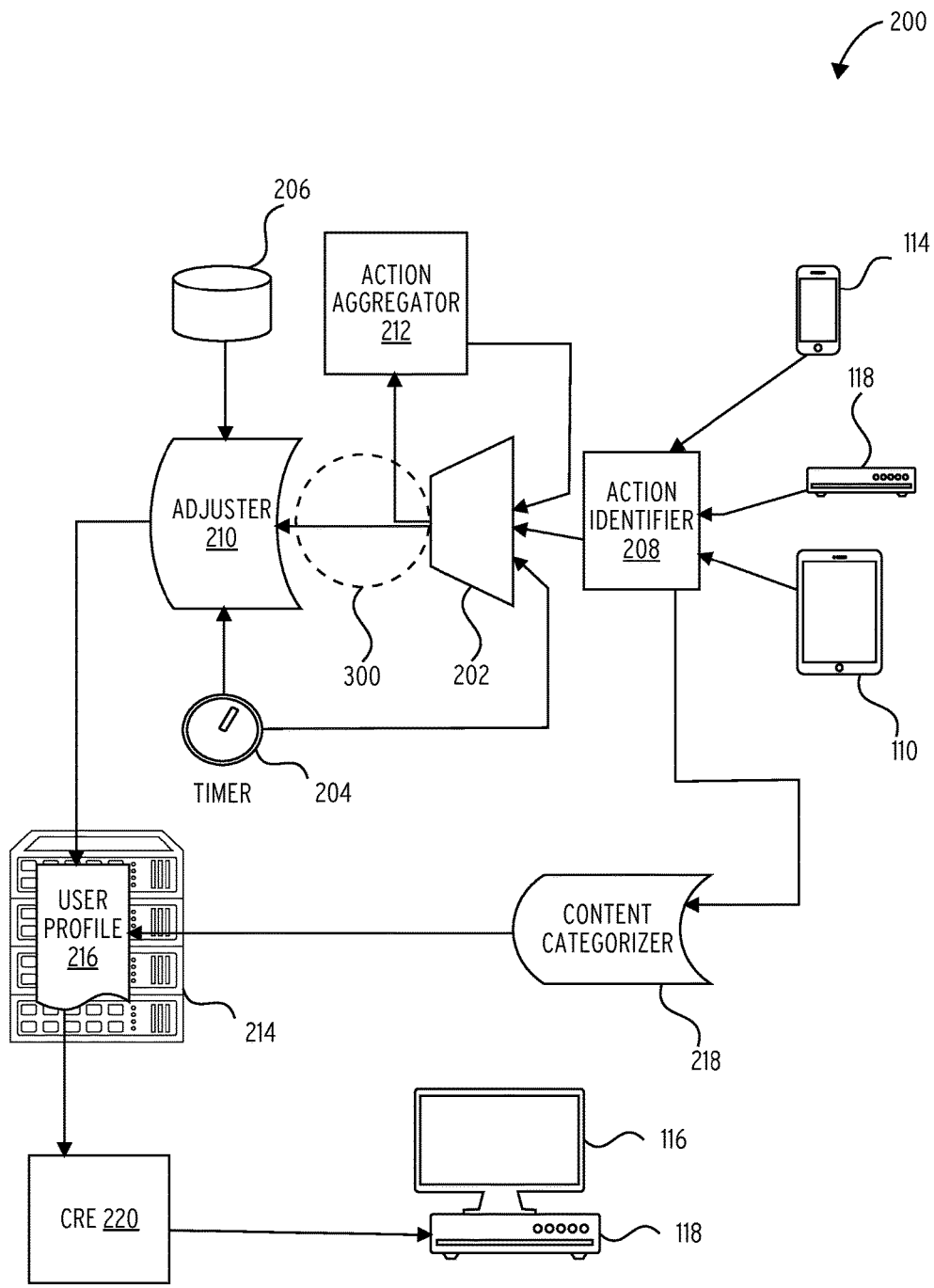
FIG. 2 illustrates an embodiment of a digital content associator 200.

FIG. 2 illustrates an embodiment of a digital content associator 200. The digital content associator 200 comprises a re-sequencer 202, a timer 204, an activity weight associator 206, an action identifier 208, an adjuster 210, an action aggregator 212, a profile server 214, a user profile 216, a content categorizer 218, a content recommender 220, and a system to operate a CRE 300.

Various end user digital devices (e.g., a mobile phone 114, set top box 118, and/or a tablet 110) operate on or in association with digital content (which may include digital advertising) and these actions are measured and identified by the action identifier 208. The identified actions are input to the re-sequencer 202 which analyzes timing among and between various identified actions, including actions separated in time but associated with the same digital content. Related actions that are close in time (within a configured time interval, for example) may be sequenced out of the re-sequencer 202 together in order, and/or may be aggregated as a meta-actions (single combined action comprising multiple component actions) by the action aggregator 212.

The action sequence (including possibly meta-actions) is input by the adjuster 210 which is responsive to adjustments from the activity weight associator 206 associated with the identified actions, and/or responsive to a timing or time spacing between actions in the action sequence, as determined by the timer 204.

The various devices are associated with one or more human users (plural users in the event of a household association, for example) by the profile server 214, which also controls access to and modification of digital files comprising one or more user profile 216. The user profile 216 associated with the user of the various devices measured for operational events and user actions is updated to associate the output of the adjuster 210 and content categories identified by the content categorizer 218 for the digital content that is associated with the device operations and/or user actions.

The content recommender 220 interoperates with the profile server 214 to apply the user profile 216 for form content recommendations for the user, and communicates these recommendations to the set top box 118 for display on the television 116.

Figure 3:
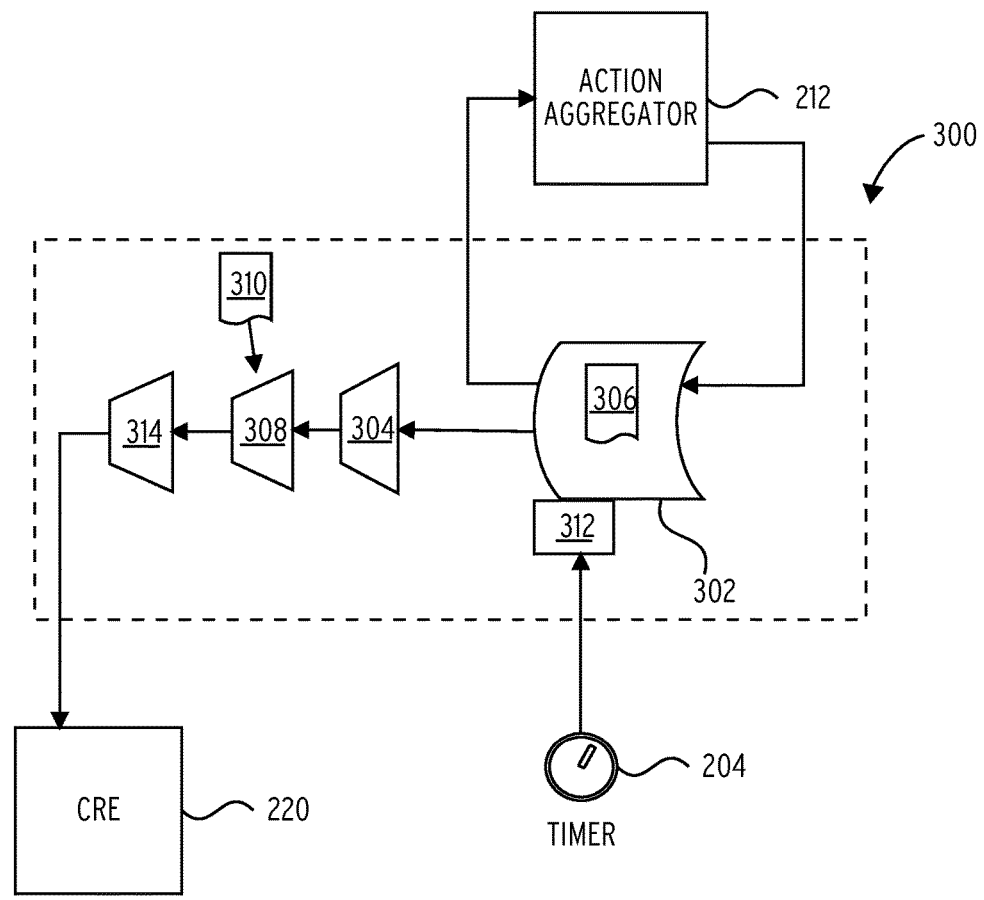
FIG. 3 illustrates an embodiment of a system to operate a CRE 300.

FIG. 3 illustrates an embodiment of a system to operate a CRE 300. The system to operate a CRE 300 comprises a minimum event time period filter 302 configured with a configured minimum time interval 306 and controlled with a timer 204 via a timer override 312.

The system to operate a CRE 300 further comprises a gate 304 receiving an output of the minimum event time period filter 302, a delay 308 configured with a configured delay interval 310, and a limiter 314.

The timer 204 is operated to control the minimum event time period filter 302 in cooperation with the action aggregator 212 to control the gate 304 for controls to the content recommender 220.

The system to operate a CRE 300 may be operated to restrict learn actions to the content recommender 220 to viewing events of higher relevance. In one embodiment the minimum event time period filter 302 is configured with a configured minimum time interval 306 of 10 minutes.

In one embodiment, the physical behavior of a viewer (person viewing digital content) is detected by sensors of an action identifier 208. The action identifier 208 may detect an event for the period of the program (content) up to the advert break; an event for the period spent by the viewer on another channel during the advert break; and an event for the period of the program after the advert break.

The system to operate a CRE 300 may operate the gate 304 to discard (e.g., filter out) the second event, so that the operation of the content recommender 220 is influenced by two consecutive events comprising the viewing up to the advert break and the period of viewing after the advert break. Furthermore, the profile server 214 may cooperate with the minimum event time period filter 302 to combine the two consecutive events into a single event having a duration of the combined duration of the two output events. This combined event may be applied to control the content recommender 220.

The delay 308 may be engaged to cause learn actions applied to the content recommender 220 to be delayed by a configured delay interval 310 (e.g., 10 minutes). The system thus operates the content recommender 220 more efficiently, and conserves memory and bandwidth resources as compared to conventional systems.

A timer override 312 may be engaged to form events. For example, events that affect operation of the content recommender 220 ("learn events") may be associated with a time other than a current time indicated by the timer 204, by associating with the events an action time parameter. For a timeslot subscriber, this may determine which timeslot the event will influence the operation of the content recommender 220 against the user profile 216. In one embodiment either of the following times may be associated with an event:

a) The start time of the content item being broadcast at the end of the configured minimum time interval 306.

b) The end time of the configured minimum time interval 306 (i.e 10 minutes after a channel change).

The option applied may depend on which date/time is accessible at the time of applying the event as a learn action against the content recommender 220.

The system may further include a re-sequencer 202 interoperable with the system to operate a CRE 300. If two short events for the same content item are interrupted by a zap away from the content item, and each of the short events measures less than the configured minimum time interval 306, the three events may be re-sequenced to make the interrupted content viewing events sequential. The short sequential events may be combined into a combined event that is longer than the configured minimum time interval 306. The combined event passes minimum event time period filter 302 and thus the gate 304 and becomes a learn event to the content recommender 220.

A limiter 314 may be employed in some embodiments. The limiter 314 may be operable to cause a single learn event to be generated for the viewing behavior after the most recent channel zap. For a specific deployment it may be that this limit to a single program should be reviewed based on local country-specific behavior. This may detect situations where the viewer has left their viewing device active but left the area. For example, a person may forget to switch off their set-top box when they go to bed at night, or when they go to work in the morning.

The system to operate a CRE 300 may generate a learn action for the above viewing behavior upon and as a result of the configured minimum time interval 306 being detected for a single or a compound event. Learning may thus take place in real time and evolves the user profile 216 as soon as possible for subsequent content recommendation requests.

Figure 4:
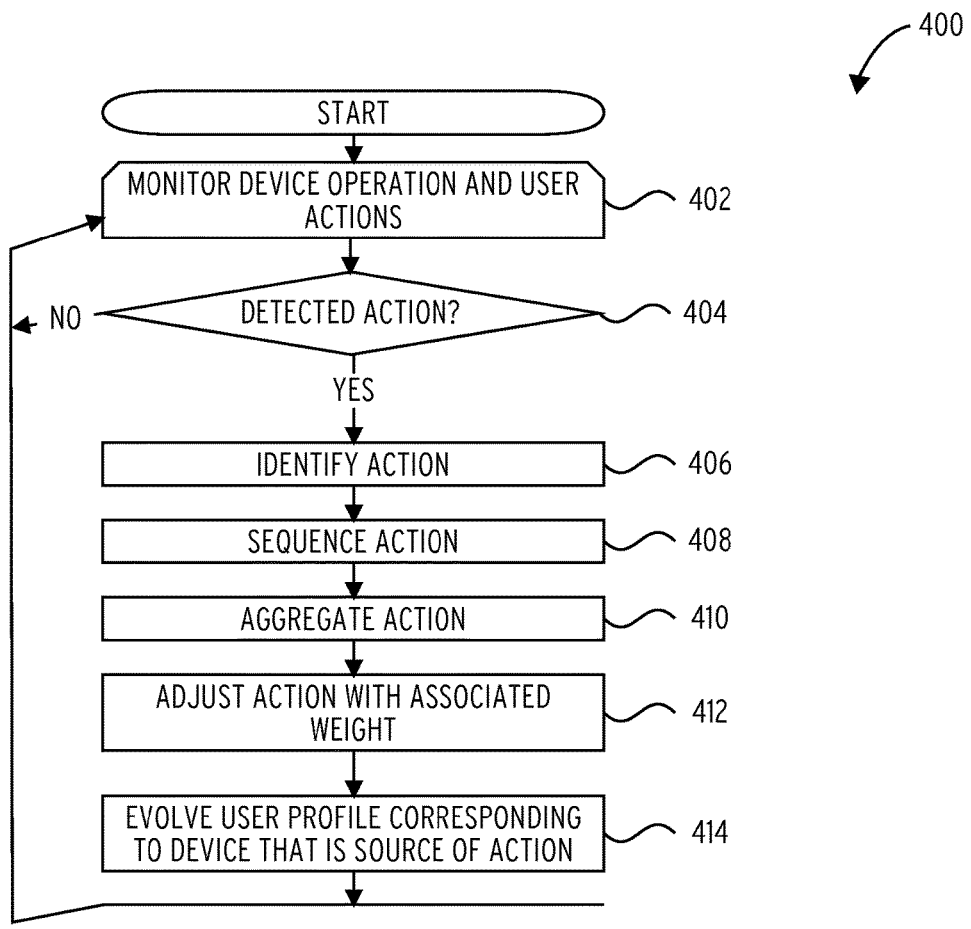
FIG. 4 illustrates an embodiment of a user profile evolution process 300.

FIG. 4 illustrates an embodiment of a user profile evolution process 400.

At opening loop block 402 the process monitors the operation of user devices and user actions on those devices. If an action (which includes user actions and device operations) is detected at decision block 404, the action is identified at block 406. The timing of the action related to other identified actions is analyzed and the action is sequenced (in some embodiments) accordingly at block 408.

The action once identified may also be aggregated with other related actions at block 410 (for example, actions all related to the same content item but separated by hours or days in time).

A weight is associated with the identified action (which may be an combined action) at block 412. The user profile is evolved to reflect the affect of the identified weighted action on user content preferences at block 414

Figure 6:
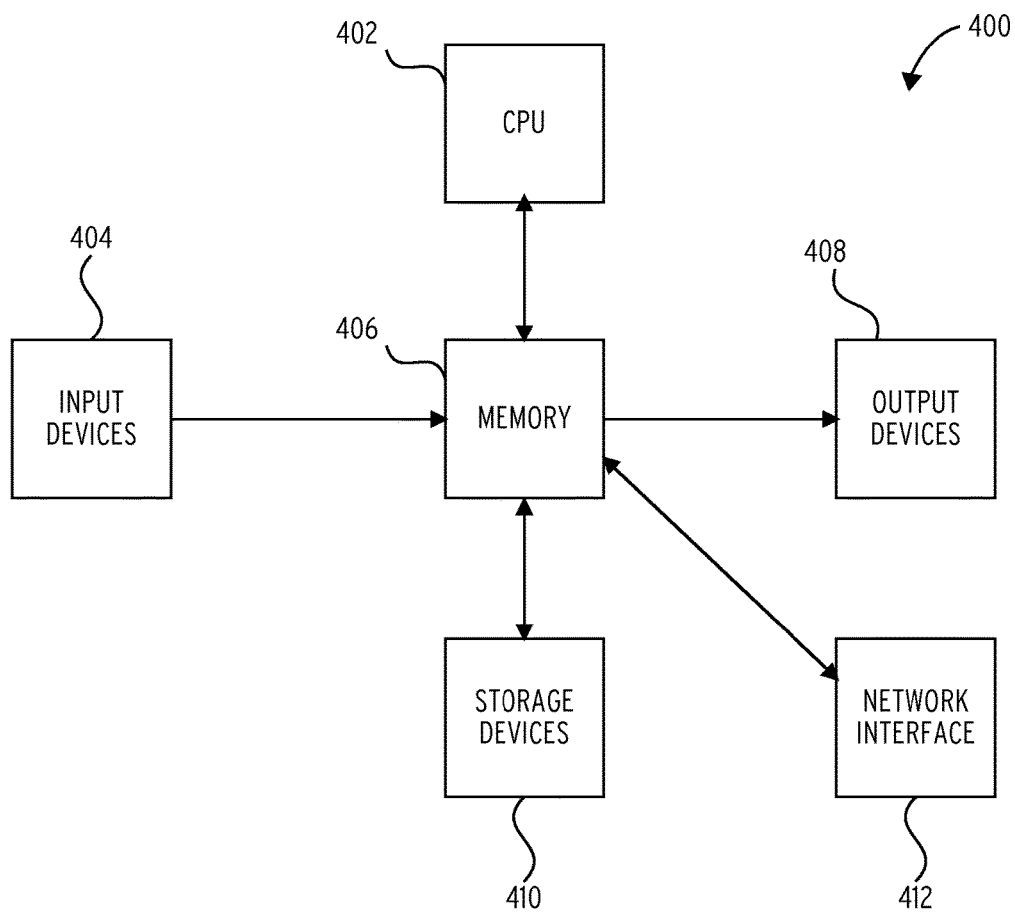
FIG. 6 illustrates an embodiment of a digital apparatus 600 to implement components and process steps of the system described herein.

FIG. 6 illustrates an embodiment of a digital apparatus 600 to implement components and process steps of the system described herein.

Input devices 604 comprise transducers that convert physical phenomenon into machine internal signals, typically electrical, optical or magnetic signals. Signals may also be wireless in the form of electromagnetic radiation in the radio frequency (RF) range but also potentially in the infrared or optical range. Examples of input devices 604 are keyboards which respond to touch or physical pressure from an object or proximity of an object to a surface, mice which respond to motion through space or across a plane, microphones which convert vibrations in the medium (typically air) into device signals, scanners which convert optical patterns on two or three dimensional objects into device signals. The signals from the input devices 604 are provided via various machine signal conductors (e.g., busses or network interfaces) and circuits to memory 606.

The memory 606 is typically what is known as a first or second level memory device, providing for storage (via configuration of matter or states of matter) of signals received from the input devices 604, instructions and information for controlling operation of the CPU 602, and signals from storage devices 610.

Information stored in the memory 606 is typically directly accessible to the CPU 602 of the device. Signals input to the device cause the reconfiguration of the internal material/energy state of the memory 606, creating in essence a new machine configuration, influencing the behavior of the digital apparatus 600 by affecting the behavior of the CPU 602 with control signals (instructions) and data provided in conjunction with the control signals.

Second or third level storage devices 610 may provide a slower but higher capacity machine memory capability. Examples of storage devices 610 are hard disks, optical disks, large capacity flash memories or other non-volatile memory technologies, and magnetic memories.

The CPU 602 may cause the configuration of the memory 606 to be altered by signals in storage devices 610. In other words, the CPU 602 may cause data and instructions to be read from storage devices 610 in the memory 606 from which may then influence the operations of CPU 602 as instructions and data signals, and from which it may also be provided to the output devices 608. The CPU 602 may alter the content of the memory 606 by signaling to a machine interface of memory 606 to alter the internal configuration, and then converted signals to the storage devices 610 to alter its material internal configuration. In other words, data and instructions may be backed up from memory 606, which is often volatile, to storage devices 610, which are often non-volatile.

Output devices 608 are transducers which convert signals received from the memory 606 into physical phenomenon such as vibrations in the air, or patterns of light on a machine display, or vibrations (i.e., haptic devices) or patterns of ink or other materials (i.e., printers and 3-D printers).

The network interface 612 receives signals from the memory 606 and converts them into electrical, optical, or wireless signals to other machines, typically via a machine network. The network interface 612 also receives signals from the machine network and converts them into electrical, optical, or wireless signals to the memory 606.

Figure 7:
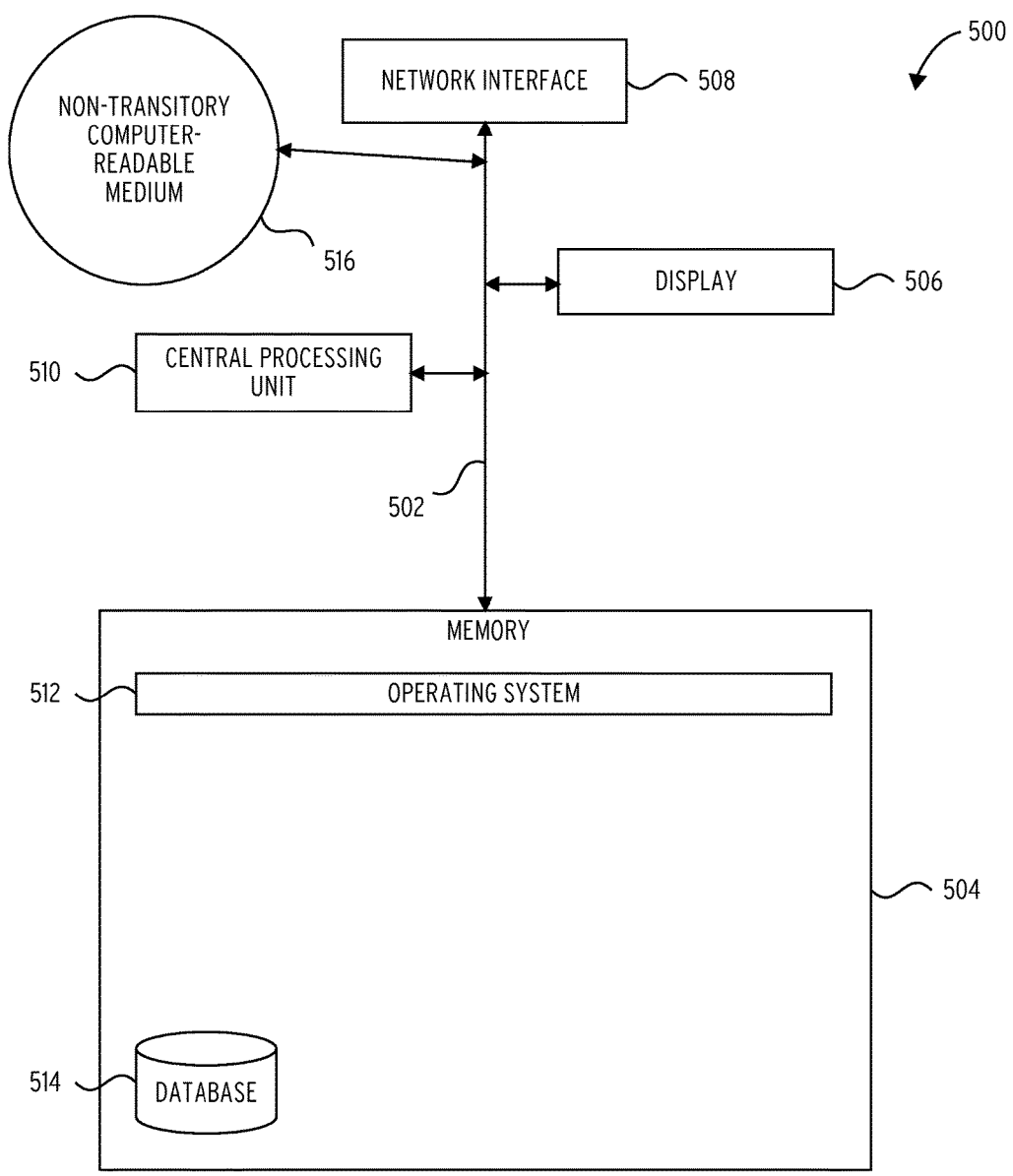
FIG. 7 illustrates a server 700 in accordance with one embodiment.

FIG. 7 illustrates several components of an exemplary server 700 in accordance with one embodiment. In various embodiments, server 700 may include a desktop PC, server, workstation, mobile phone, laptop, tablet, set-top box, appliance, or other computing device that is capable of performing operations such as those described herein. In some embodiments, server 700 may include many more components than those shown in FIG. 7. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, server 700 may comprise one or more physical and/or logical devices that collectively provide the functionalities described herein. In some embodiments, server 700 may comprise one or more replicated and/or distributed physical or logical devices.

In some embodiments, server 700 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Server 700 includes a bus 702 interconnecting several components including a network interface 708, a display 706, a central processing unit 710, and a memory 704.

Memory 704 generally comprises a random access memory ("RAM") and permanent non-transitory mass storage device, such as a hard disk drive or solid-state drive. Memory 704 stores an operating system 712.

These and other software components may be loaded into memory 704 of server 700 using a drive mechanism (not shown) associated with a non-transitory computer-readable medium 716, such as a floppy disc, tape, DVD/CD-ROM drive, memory card, or the like.

Memory 704 also includes database 714. In some embodiments, server 700 may communicate with database 714 via network interface 708, a storage area network ("SAN"), a high-speed serial bus, and/or via the other suitable communication technology.

In some embodiments, database 714 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application.

When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

What is claimed is:

1. A machine system for operating a digital content recommendation system, comprising:
   a monitor to detect and identify user actions as events on network connected digital devices;
   a first associator to relate the user actions to digital content;
   a timer to control a minimum time period filter on the user actions;
   a sequencer that in conjunction with the timer, the minimum time period filter, and a combiner transforms the user actions into aggregate user actions;
   the content recommendation system responsive to the aggregate user actions to evolve a computer-stored user profile according to the aggregate user actions;

the user profile applied by the digital content recommendation system to select and route digital content to particular end user devices; and a timer override applied to the events, such that events that affect machine system learning are associated with an override time other than a current time output by the timer, such that for a timeslot subscriber, the override time determines which timeslot the event will influence the machine system learning, for viewed content that starts on a timeslot boundary.

2. The machine system of claim 1, wherein the override time is a start time of a content item being broadcast at an end of a period of the minimum time period filter.

3. The machine system of claim 1, wherein the override time is an end of a period of the minimum time period filter.

4. The machine system of claim 1, further comprising:
a second associator that in conjunction with the timer and an adjuster associates weight values with the aggregate user actions and the user actions, forming weighted user actions; and
the content recommendation system responsive to the weighted user actions to evolve the user profile.

5. The machine system of claim 1, further comprising:
the monitor to further detect and identify operations of the digital devices; and
the first associator to relate the operations of the digital devices to the user actions.

6. The machine system of claim 1, further comprising:
a content recommender to recommend the digital content to the digital devices responsive to the user profile.

7. The machine system of claim 1, further comprising:
the aggregate user actions formed based on configured intervals between the user actions as measured by the timer.

8. The machine system of claim 1, further comprising:
at least one of the aggregate user actions formed from an accumulation of playback of a particular digital content item over a plurality of separated time intervals.

9. A method for operating a digital content recommendation system, comprising:
detecting and identifying user actions as events on network connected digital devices;
relating the user actions to digital content;
operating a timer to control a minimum time period filter on the user actions;
operating a sequencer in conjunction with the timer, the minimum time period filter, and a combiner to transform the user actions into aggregate user actions;
operating the content recommendation system by applying the aggregate user actions to evolve a computer-stored user profile according to the aggregate user actions;
applying the user profile to select and route digital content to particular end user devices;
operating timer override on the events, such that events that affect machine system learning are associated with an override time other than a current time output by the timer; and
for a timeslot subscriber, applying the override time to determine which timeslot the event will influence the machine system learning, for viewed content that starts on a timeslot boundary.

10. The method of claim 9, further comprising:
operating the timer and an adjuster to associate weight values with the aggregate user actions and the user actions, forming weighted user actions; and
operating the content recommendation system by applying the weighted user actions to evolve the user profile.

11. The method of claim 9, further comprising:
detecting and identifying operations of the digital devices; and
relating the operations of the digital devices to the user actions.

12. The method of claim 9, further comprising:
operating the content recommender to recommend the digital content to the digital devices responsive to the user profile.

13. The method of claim 9, further comprising:
forming the aggregate user actions from configured intervals between the user actions as measured by the timer.

14. The method of claim 9, further comprising:
forming at least one of the aggregate user actions from an accumulation of playback of a particular digital content item over a plurality of separated time intervals.

15. A non-transitory computer-readable storage medium for operating a digital content recommendation system, the computer-readable storage medium including instructions that when executed by a computer, cause the computer to:
detect and identify user actions on network connected digital devices;
relate the user actions to digital content;
operate a timer to control a minimum time period filter on the user actions;
operate a sequencer in conjunction with the timer, the minimum time period filter, and a combiner to transform the user actions into aggregate user actions;
operate the content recommendation system by applying the aggregate user actions to evolve a computer-stored user profile according to the aggregate user actions;
applying the user profile to select and route digital content to particular end user devices; and
operating timer override on the events, such that events that affect machine system learning are associated with an override time other than a current time output by the timer; and
for a timeslot subscriber, applying the override time to determine which timeslot the event will influence the machine system learning, for viewed content that starts on a timeslot boundary.

16. The non-transitory computer-readable storage medium of claim 15, wherein the instructions further cause the computer to:
operate the timer and an adjuster to associate weight values with the aggregate user actions and the user actions, forming weighted user actions; and
operate the content recommendation system by applying the weighted user actions to evolve the user profile.

17. The non-transitory computer-readable storage medium of claim 15, wherein the instructions further cause the computer to:
detect and identify operations of the digital devices; and
relate the operations of the digital devices to the user actions.

18. The non-transitory computer-readable storage medium of claim 15, wherein the instructions further cause the computer to:
operate the content recommender to recommend the digital content to the digital devices responsive to the user profile.

19. The non-transitory computer-readable storage medium of claim 15, wherein the instructions further cause the computer to:

form the aggregate user actions from configured intervals between the user actions as measured by the timer.

20. The non-transitory computer-readable storage medium of claim 15, wherein the instructions further cause the computer to:
form at least one of the aggregate user actions from an accumulation of playback of a particular digital content item over a plurality of separated time intervals.

21. The non-transitory computer-readable storage medium of claim 15, wherein the override time is a start time of a content item being broadcast at an end of a period of the minimum time period filter.

22. The non-transitory computer-readable storage medium of claim 15, wherein the override time is an end of a period of the minimum time period filter.

\* \* \* \* \*